J. BEARD.
TRACTOR WHEEL.
APPLICATION FILED JULY 27, 1915.

1,155,872.

Patented Oct. 5, 1915.

WITNESSES

INVENTOR
James Beard
BY Munn & Co
ATTORNEYS

UNITED STATES PATENT OFFICE.

JAMES BEARD, OF TWO RIVERS, CALIFORNIA.

TRACTOR-WHEEL.

1,155,872.  Specification of Letters Patent.  Patented Oct. 5, 1915.

Application filed July 27, 1915.  Serial No. 42,149.

*To all whom it may concern:*

Be it known that I, JAMES BEARD, a citizen of the United States, and a resident of Two Rivers, in the county of Mendocino and State of California, have invented a new and Improved Tractor-Wheel, of which the following is a full, clear, and exact description.

My invention relates to the type of tractor wheel forming the subject-matter of my United States application filed February 5, 1914, Serial No. 816,738, in which separate rigid track sections are arranged in angular relation to each other and in connection with gear elements in mesh with and mating elements on the track sections, so that the latter are alternately turned.

In my present invention, I provide an improved arrangement of the gear elements and track sections, whereby said track sections will embrace and house the gear elements to a practical extent, whereby to exclude grit, etc.

The invention will be particularly explained in the specific description following.

Figure 1:
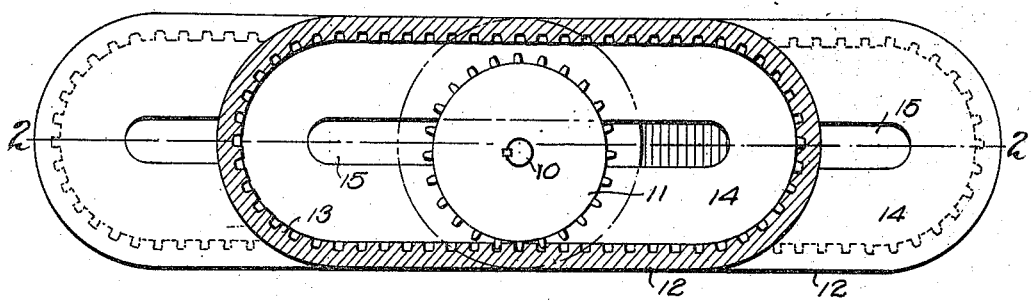
Figure 2:
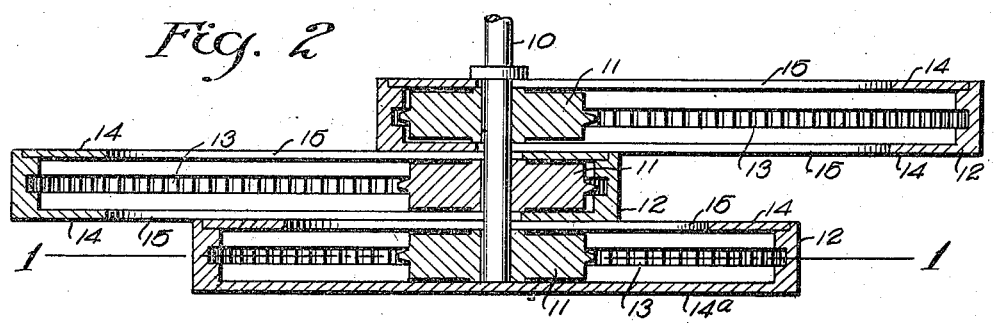
Figure 3:
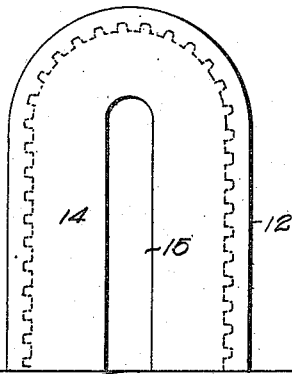

Reference is had to the accompanying description forming part of this specification, in which similar characters of reference indicate corresponding parts in all the views, and in which:

Figure 1 is a sectional side elevation of a tractor wheel embodying my invention, the section being taken on the line 1—1 Fig. 2; Fig. 2 is a transverse vertical section on the line 2—2 Fig. 1; and Fig. 3 is a side elevation.

In carrying out my invention in accordance with the illustrated example, an axle 10 is provided and fixed thereon are a series of gear wheels 11. Associated with each gear wheel 11 is an oblong track section 12 provided on the interior with a continuous rack or series of teeth 13 with which the gear wheels 11 mesh. The respective track sections are rigid and non-deformable and are movable relatively to one another in response to the turning of the wheels 11. The several sections are disposed with their major axes in such angular relation that a longer side of one track section will be always on the ground. I find that a series of three track sections 12 and corresponding gear wheels 11 is particularly effective in insuring an ample surface in contact with the ground. The wheel 11 in turning will travel along that section presenting its major axis horizontally, and will carry along and turn the mating track sections bodily until the forward end of the first mentioned section is reached by the gear wheel, whereupon the said first mentioned section will be turned upwardly to present an end thereof as the bearing or track surface, and thus the respective sections will be brought successively into the horizontal position, the several sections being alternately and intermittently turned.

In order to house the gear wheels and protect these and the racks 13 from grit, etc., to a practical extent, I provide the track sections with side plates 14, the several side plates being formed with elongated slots along the median line lengthwise of the section. The slots 15 are produced in all the side plates except the outer plate 14ª of the outermost section 12, which need not be slotted, but can be completely closed, as shown, since said outer plate lies beyond the end of the axle 10. The slots 15 are thus at a height to minimize the quantity of grit that will find its way to the interior, and in any event prevent any material amount of grit from accumulating within the track sections, owing to the movements imparted to the latter.

Having thus described my invention, what I claim as new and desire to secure by Letters Patent, is:

In a tractor wheel, a series of separate, self-laying, oblong, rigid track sections disposed side by side with their major axes in angular relation, said sections each having a continuous internal series of gear teeth, an axle, and a series of gear wheels on said axle, one for each track section, and in mesh with the teeth of the latter, the said track sections having side plates embracing and housing the respective gear wheels and providing oblong passages for the relative displacement of the track sections on the axle.

In testimony whereof I have subscribed my name to this specification in the presence of two subscribing witnesses.

JAMES BEARD.

Witnesses:
  ELMO CLARK,
  F. A. TIE.

Copies of this patent may be obtained for five cents each, by addressing the "Commissioner of Patents, Washington, D. C."